United States Patent
Sone

(10) Patent No.: US 6,922,263 B2
(45) Date of Patent: Jul. 26, 2005

(54) IMAGE SCANNER FOR USE IN IMAGE FORMING APPARATUS

(75) Inventor: Toshihiro Sone, Yokohama (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 848 days.

(21) Appl. No.: 09/965,797

(22) Filed: Oct. 1, 2001

(65) Prior Publication Data

US 2003/0063327 A1 Apr. 3, 2003

(51) Int. Cl.[7] .............................. H04N 1/40; H04N 1/04
(52) U.S. Cl. ...................... 358/461; 358/497; 358/475; 382/274; 399/207
(58) Field of Search .................................. 358/461, 497, 358/475, 474, 406, 504; 382/274; 250/234–236; 399/207

(56) References Cited

U.S. PATENT DOCUMENTS

| | | | | |
|---|---|---|---|---|
| 5,206,501 A | * | 4/1993 | Sakakibara et al. | 250/208.1 |
| 5,371,613 A | * | 12/1994 | Arimoto et al. | 358/461 |
| 5,943,141 A | | 8/1999 | Tamura | 358/461 |
| 5,970,181 A | * | 10/1999 | Ohtsu | 382/274 |
| 6,430,378 B1 | * | 8/2002 | Ozawa | 399/32 |
| 6,771,397 B2 | * | 8/2004 | Hashizume | 358/474 |

FOREIGN PATENT DOCUMENTS

| | | |
|---|---|---|
| JP | 5-31868 | 5/1993 |
| JP | 10-164362 | 6/1998 |
| JP | 11-205606 | 7/1999 |

\* cited by examiner

*Primary Examiner*—Cheukfan Lee
(74) *Attorney, Agent, or Firm*—Foley & Lardner LLP

(57) ABSTRACT

In an image reading apparatus according to the present invention, a black reference plate used for shading correction includes a light shielding plate. When the light shielding plate shields an optical path leading to a CCD sensor, the light emitted from an illumination device is prevented from falling on the CCD sensor.

15 Claims, 5 Drawing Sheets

IMAGE SCANNER FOR USE IN IMAGE FORMING APPARATUS

BACKGROUND OF THE INVENTION

The present invention relates to an image reading apparatus for acquiring image data used in an image forming apparatus of an electrophotographic type, and also to an image forming apparatus including the image reading apparatus.

An image scanner acquires image data by causing an image reading sensor to execute photoelectric conversion with respect to the reflected light obtained when a read object, such as a sheet-like document, a book, or a three-dimensional object, is irradiated with light.

The image scanner has a transparent document holder (document table) on which an object to be read is held, an illumination device including an illuminating lamp and illuminating the read object placed on the document table, a CCD sensor functioning as an image reading sensor, an optical set (incl. a plurality of mirrors and a reducing glass) located between the document table and the CCD sensor, etc. An analog electrophotographic apparatus, wherein a photosensitive member and a mirror for exposing the image data to the photosensitive member are arranged in place of the CCD sensor and the reflected light from a read object is guided to the photosensitive member, employs a document table (a document holder), an illuminating device and an optical set that are similar in structure to those described above.

With respect to image scanners, it is known that the amount of light emitted therein varies depending upon the deterioration of the illuminating lamp and a change in temperature. In addition, CCD sensors manufactured as products may have different sensitivities from the beginning. Furthermore, pixels also differ in sensitivity. For these reasons, the image data outtput from the CCD sensors is not sufficient for uniform reproduction of image information on a read object. Hence, the image output from the image forming apparatus may be poor in quality.

To provide a solution to this problem, shading data (white reference data and black reference data) is prepared. The data is used as a reference when the CCD sensor converts an image on a read object into image data. The data is based on the optical intensities which the reflected light has when a white reference plate or a black reference plate of a predetermined brightness is irradiated with light. On the basis of the white reference data and black reference data, the image data is subjected to shading correction (i.e., the setting of coefficients for brightness correction). The accuracy of shading correction is of great significance. In many cases, therefore, the data on several lines (the length direction) is averaged in units of one pixel (the width direction) so that dust or foreign matter present (or adhered) around the black reference plate and white reference plate may not be read as an image.

When shading data is obtained, the speed at which the illuminating lamp is moved in the unit time for guiding the reflected light from either the black or white reference plate to the CCD sensor, must be the same as the speed at which the same illuminating lamp is moved in the unit time for actually reading the reflected light (for photoelectric conversion).

In other words, if the amount of reflected light coming from the each of the black reference plate and white reference plate and falling on the pixels varies during the read time (during which the charge produced by the photoelectric conversion of the reflected light falling on the pixels of the CCD sensor is acquired), the reference level of the image data output from the CCD sensor may change.

In many image scanners, the reference plates are arranged in parallel in the direction in which the carriage that holds the illuminating lamp is moved (i.e., the direction in which the document holder extends). This arrangement gives rise to a variety of factors leading to unstable reference data. The factors include the following:

1) In the case where the black reference plate is arranged in front of the white reference plate in a horizontal plane and is therefore irradiated with light before the white reference plate is, the reflected light from the black reference plate is first received, and black reference data is obtained thereby. Immediately after this, the reflected light from the white reference plate is supplied. Hence, the amount of reflected light coming from the white reference plate is inevitably more than the necessary amount at a boundary between the black reference plate and the white reference plate. As a result, an accuracy of the black reference data deteriorates.

2) In the case where the black and white reference plates are arranged in the manner described in 1), the reflected light from the black reference plate is received for a predetermined length of time, and then the reflected light from the white reference plate is supplied. With this in mind, the gain of the CCD sensor is attenuated for reliable detection of the reflected light from the white reference plate. However, if the reflected light from the rear end of the black reference plate falls in the gain-attenuated state of the CCD sensor, the reflected light from the black reference plate is supplied at the boundary though the reflected light from the white reference plate should be supplied there. Accordingly, the accuracy of the white reference data is adversely affected.

3) In the case where the white reference plate is located in front of the black reference plate, the reflected light from the white reference plate is received first, and then the reflected light from the black reference plate is received. In this case, the reflected light from the front end of the black reference plate may fall at the boundary, with the gain attenuated on the condition that the reflected light from the white reference is received. As a result, the accuracy of the white reference data is adversely affected.

4) In the case where the black and white reference plates are arranged in the manner described in 3), the reflected light from the white reference plate is received for a predetermined length of time, and then the reflected light from the black reference plate is supplied. Even if the reception of the reflected light from the black reference plate continues before the sampling reference used by the CCD sensor is changed to a value suited to the black reference plate, the reception takes place, with the gain kept at a low value. As a result, the accuracy of the black reference data is adversely affected.

In a scanner with a high reading rate, the black and white reference plates must be wide (the dimension in the sub scan direction must be increased) as viewed in the direction in which the carriage holding the illuminating lamp moves (i.e., in the direction in which the illuminating lamp moves). This calls for a long distance (a carriage acceleration distance) that enables acceleration of the carriage. The carriage must be accelerated so that it can be moved at the image reading speed before it enters the regions corresponding to the black and white reference plates.

However, if the black and white reference plates that are wide as viewed in the moving direction of the illuminating lamp must be arranged in addition to the document table (which is large enough to hold a maximum-sized read object), then the overall size of the scanner (i.e., the projection area) is inevitably large. This is just the opposite to what is required of recent image scanners, wherein the carriage accelerating distance must be as short as possible to reduce the overall size.

If the carriage accelerating distance is improperly shortened, the carriage must be accelerated rapidly. In this case, it is likely that the carriage will vibrate during acceleration. If the carriage vibrates, the vibration adversely affects the reference data that has effects on the accuracy of the shading correction. If the carriage is accelerated too fast in a scanner wherein the carriage accelerating distance is insufficient, the carriage may reach the leading end of an image before the vibration produced during the acceleration converges (fades away). In this case, the reading of a document image is started when the carriage is still vibrating, and image information at the leading end of the document is hard to read with accuracy.

Another type of scanner is proposed which employ no black reference plate and temporarily stops the light emission from the illuminating lamp. However, temporarily turning off the illuminating lamp has problems in that white reference data cannot be reliably obtained. Specifically, when the white illumination plate is subsequently irradiated with light to obtain white reference data, the white reference data cannot be obtained until the amount of light emitted from the illuminating lamp is saturated.

It follows from this that the time needed before the start of an image on the read object placed on the document table is inevitably increased. Therefore, the total read time needed before the completion of an image increases. In particular, the total read time required when an image of a one-page document is read inevitably increases. This being so, even if an image scanner with a high read rate is used, the number of pages that can be actually read is not large.

A color image scanner is known which decomposes a document image into three primary colors for additive process, namely, R (red), G (green) and B (blue), and outputs three kinds of image data. In this type of scanner, reading is executed by use of a photoelectric conversion element. This element is made up of at least three lines of red (R), green (G) and blue (B); alternatively, it is made up of at least four lines of red (R), green (G), blue (B) and black (K). The memory capacity required may increase, depending upon the size of the reference data generated based on the reflected light from the black and white reference plates.

BRIEF SUMMARY OF THE INVENTION

An object of the present invention is to provide an image reading apparatus capable of acquiring white reference data and black reference data with accuracy.

According to the present invention, there is provided an image reading apparatus comprising:

a CCD sensor which converts image information on an object to be read into an image signal;

an illumination device which illuminates the object and generates light and shade corresponding to the image information;

a mirror set which conveys the light and shade corresponding to the image information to the CCD sensor;

a moving mechanism which moves the mirror set along the object at a predetermined speed;

a driving device which provides the moving mechanism with a driving force;

a first reference level generation mechanism which is provided at a predetermined position on the moving mechanism and allows the CCD sensor to generate a first reference level output without reference to optical intensity of illumination light emitted from the illumination device; and a second reference level generation mechanism which generates reflected light when illuminated by the illumination device, the second reference level generation mechanism being located at such a position as prevents the reflected light from being transmitted to the CCD sensor, when the first reference level generation mechanism causes the CCD sensor to produce the first reference level output, and the second reference level generation mechanism being moved away from the position by a predetermined distance, thereby enabling the reflected light to be transmitted to the CCD sensor without reference to the first reference level generation mechanism.

According to the present invention, there is also provided an image reading apparatus comprising:

a CCD sensor which converts image information on an object to be read into an image signal;

an illumination device which illuminates the object;

a first mirror which guides image light in a predetermined direction, the image light being light-and-shade information and including image information which is generated by the object illuminated by the illumination device;

a second mirror which guides the image light transmitted from the first mirror such that the image light is guided in a predetermined direction;

a third mirror which guides the image light transmitted from the second mirror such that the image light is guided in a predetermined direction;

a lens which forms an image on the CCD sensor by converging the image light transmitted from the third mirror;

a first mirror moving mechanism which holds the first mirror and the illumination device to be movable along the image information on the object;

a second mirror moving mechanism which movably holds the second mirror and the third mirror, the second mirror moving mechanism being moved by the first mirror moving mechanism such that a moving distance of the second moving mechanism is half that of the first mirror moving mechanism;

a driving device for generating an impulsion force that allows the first and second mirror moving mechanisms to move in a predetermined direction; and a first reference level generation mechanism which is provided at a predetermined position on the first mirror moving mechanism and allows the CCD sensor to generate a first reference level output by shielding a light path between the second and third mirrors held by the second mirror moving mechanism when the first mirror moving mechanism is moved in the predetermined direction by the impulsion force provided by the driving device; and a second reference level generation mechanism which generates reflected light when illuminated by the illumination device, the second reference level generation mechanism being located at such a position as prevents the reflected light from being transmitted to the CCD sensor, when the first reference level generation mechanism causes the CCD sensor to produce the first reference level output, and the second reference level generation mechanism being moved away from the position by a predetermined distance, thereby enabling the reflected light to be transmitted to the CCD sensor without reference to the first reference level generation mechanism.

According to the present invention, there is further provided an image forming apparatus comprising:

an image reading apparatus including:

a CCD sensor which converts image information on an object to be read into an image signal;

an illumination device which illuminates the object;

a first mirror which guides image light in a predetermined direction, the image light being light-and-shade information and including image information which is generated by the object illuminated by the illumination device;

a second mirror which guides the image light transmitted from the first mirror such that the image light is guided in a predetermined direction;

a third mirror which guides the image light transmitted from the second mirror such that the image light is guided in a predetermined direction;

a lens which forms an image on the CCD sensor by converging the image light transmitted from the third mirror;

a first mirror moving mechanism which holds the first mirror and the illumination device to be movable along the image information on the object;

a second mirror moving mechanism which movably holds the second mirror and the third mirror, the second mirror moving mechanism being moved by the first mirror moving mechanism such that a moving distance of the second moving mechanism is half that of the first mirror moving mechanism;

a driving device for generating an impulsion force that allows the first and second mirror moving mechanisms to move in a predetermined direction;

a first reference level generation mechanism which is provided at a predetermined position on the first mirror moving mechanism and allows the CCD sensor to generate a first reference level output by shielding a light path between the second and third mirrors held by the second mirror moving mechanism when the first mirror moving mechanism is moved in the predetermined direction by the impulsion force provided by the driving device;

a second reference level generation mechanism which generates reflected light when illuminated by the illumination device, the second reference level generation mechanism being located at such a position as prevents the reflected light from being transmitted to the CCD sensor, when the first reference level generation mechanism causes the CCD sensor to produce the first reference level output, the second reference level generation mechanism being moved away from the position by a predetermined distance, thereby enabling the reflected light to be transmitted to the CCD sensor without reference to the first reference level generation mechanism;

a position notification mechanism provided at a predetermined position of the first mirror moving mechanism and outputting notification information regarding a position where the first mirror moving mechanism is located; and a moving mechanism position-detecting device which is located at a position related to the first and second reference level generation mechanisms, and which detects at least one of passage and arrival of the first mirror moving mechanism with reference to the position notification mechanism;

a photosensitive member on which an image corresponding to the image data read by the image reading is formed; and a developing device for supplying a developing agent to the image formed on the photosensitive member, wherein the first reference level generation mechanism enables the CCD sensor to generate a first reference level when the moving mechanism position-detecting device detects the position notification mechanism provided on the first mirror moving mechanism, and the second reference level generation mechanism provides reflected light toward the CCD sensor in a preset period of time, the preset period of time starting at a time when the moving mechanism position-detecting device has detected the position notification mechanism provided on the first mirror moving mechanism and ending at a time when the driving device has moved the first mirror moving mechanism by a distance corresponding to either a predetermined number of pulses or a predetermined length of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
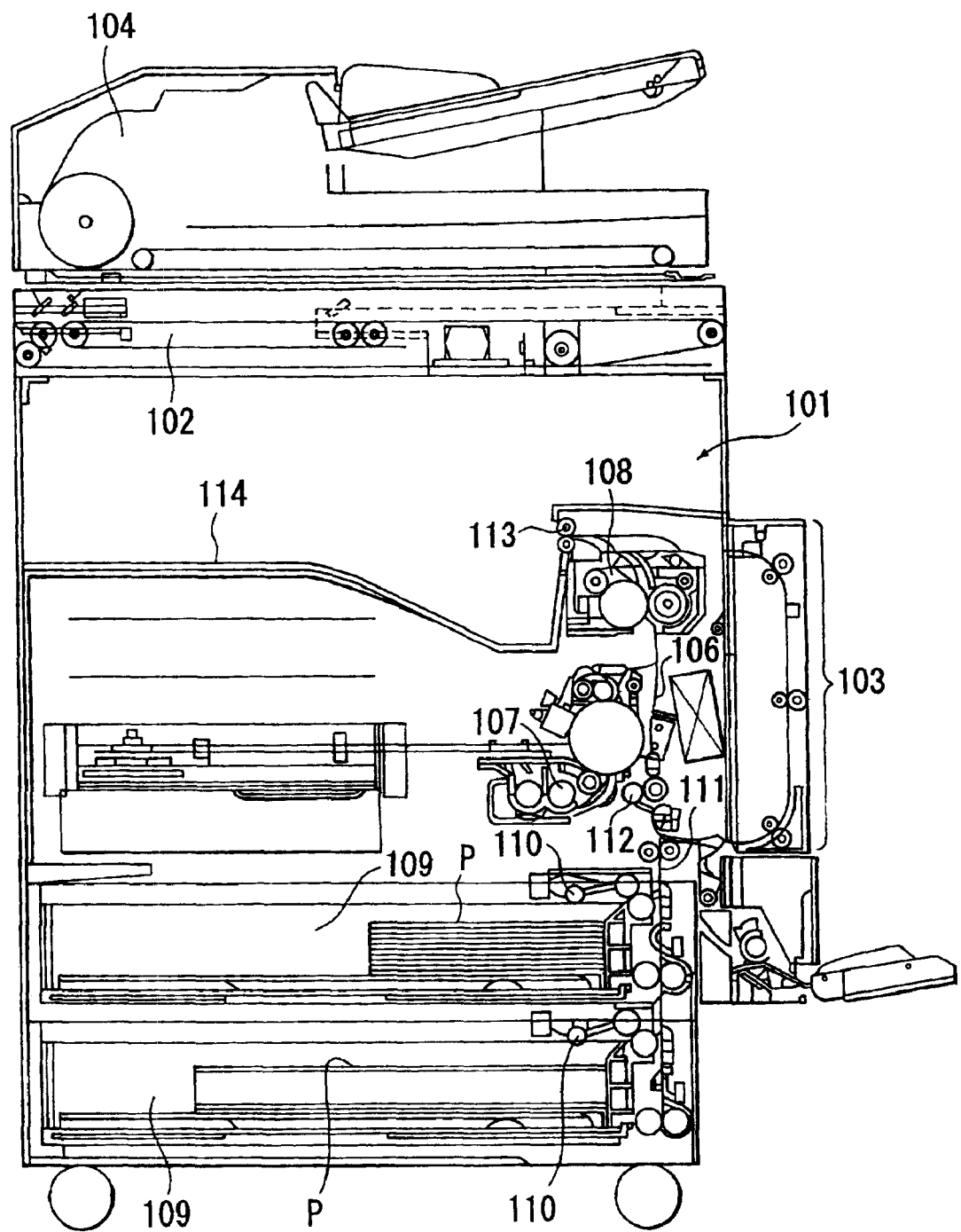
FIG. 1 is a schematic illustration showing an example of an image forming apparatus in which an image reading apparatus according to the present invention is incorporated.

An example of an image forming apparatus to which the present invention is applied will now be described, referring to the drawings, of which is a schematic illustration of a digital copying machine.

As shown in FIG. 1, the digital copying machine 101 includes: a scanner 102 for reading image information on an object to be copied in the form of the light and shade and thereby producing an image signal, and an image forming section 103 for forming an image corresponding to an image signal supplied externally or from the scanner 103. The scanner 102 is integrally provided with an automatic document feeder (ADF) 104. Where the object to be copied is a sheet, the ADF 104 operates in association with the image reading operation executed by the scanner 102 and sequentially feeds sheets (objects to be copied).

The image forming section 103 has an exposure device 105 for emitting a laser beam whose intensity is varied in accordance with image information, which is supplied from the scanner 102 or an external device, a photosensitive drum 106 for holding an image corresponding to the laser beam emitted from the exposure device, a developing device 107 for supplying a developing agent to the image formed on the photosensitive drum 106, a fixing device 108 for melting and fixing a developer image onto a transfer material, the developer image being formed on the photosensitive drum 106 by the developing device 107 and then transferred to the transfer material by a sheet feeding section, which is to be described later; etc.

When image information is supplied from the scanner 102 or an external device, the exposure device 105 outputs a laser beam to the outer circumference of the photosensitive drum 106. The outer circumference is charged to a predetermined potential by a charging device (not assigned with a reference numeral), and the laser beam has its intensity varied on the basis of image information. With the laser beam, an electrostatic latent image corresponding to an image to be copied is formed on the photosensitive drum 106.

The electrostatic latent image (not shown) formed on the photosensitive drum 106 is developed when it is selectively provided with toner (not shown) from the developing device 107. As a result, the electrostatic latent image is converted into a toner image (not shown). The toner image (not shown) formed on the surface of the photosensitive drum is then transferred onto a sheet P at a transfer position where the photosensitive drum 106 faces a transfer device. The sheet P is fed from a sheet cassette 109 containing a large number of sheets P. One of the sheet P is taken out of the sheet cassette 109 one by one by a pickup roller 110 and is conveyed toward the photosensitive drum 106 along a conveyance path 111. The sheet P is fed (to the transfer position) after timing adjustment with reference to the toner image on the photosensitive drum 106. The timing adjustment is made by means of an aligning roller 112, by which the sheet feeding is controlled with reference to the toner image (developer image) formed on the photosensitive drum 106. The sheet P bearing the toner transferred thereto is then conveyed to the fixing device 108. The fixing device 108 applies heat and pressure to the toner, thereby adhering (fixing) the toner to the sheet P.

After the fixing device 108 fixes the toner image (not shown), the sheet P is discharged into a discharge space 114 (onto a discharge tray) defined between the scanner 102 and the sheet cassette 109.

Figure 2:
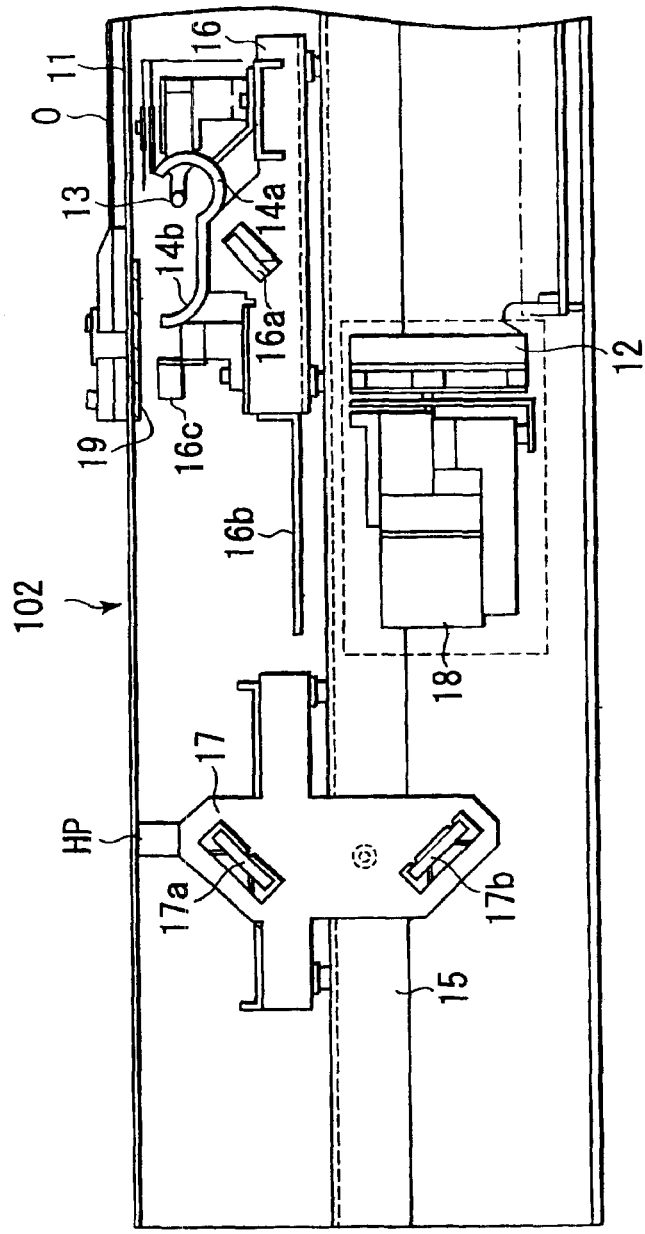
FIG. 2 is a schematic illustration showing an example of an image reading apparatus which is incorporated in the image forming apparatus depicted in FIG. 1.

FIG. 2 is a schematic illustration showing an example of an image reading apparatus (a scanner) which is incorporated in the image forming apparatus depicted in FIG. 1.

As shown in FIG. 2, the scanner 102 includes a document table 11 and a CCD sensor 12 arranged at predetermined positions. The document table 11 is a transparent plate member formed of a material that allows light to pass therethrough (such as glass) and is substantially uniform in thickness. The document table 11 holds an object to be read (to be copied). The image information is guided to the CCD sensor by means of a plurality of mirrors described below. The CCD sensor 12 converts image information on the object into an electric signal.

In the space under the document table 11, an illumination lamp 13 and first and second reflectors 14a and 14b extend along the document table 11. The illumination lamp 13 illuminates an object O to be read when this object O is placed on the document table 11. The first and second reflectors 14a and 14b reflect the light emitted by the illumination lamp 13 in such a manner that the light is converged at the predetermined position on the document table 11. The illumination lamp 13 and the two reflectors 14a and 14b are longer than one side of the object O placed on the document table 11. The illumination lamp 13 and the two reflectors 14a and 14b are secured to a first carriage 16, and this carriage is movable back and forth on a rail 15 along the surface of the document table 11.

The first carriage 16 is provided with a first image mirror 16a which guides image light in a predetermined direction. The first image mirror 16a is guided the image light or the reflected light coming from an object O to be read toward the predetermined direction. The image light which is created by illumination light generated from the illumination lamp 13 and the two reflectors 14a and 14b is including an image information on the object O, and which enables an image portion and a non-image portion to be detected as light and shade, i.e., reflectivity differences (this image light or the reflected light will be hereinafter referred to as "image light"). The first image mirror 16a is longer than one side of the object O placed on the document table 11.

A second carriage 17 is located at a position which is in the vicinity of the first carriage 16 and to which the image light reflected by the first image mirror is guided. The second carriage 17 is movable back and forth on the rail 15 along the document table 11, and the movement of the second carriage 17 is determined in relation to the position and moving speed of the first carriage 16.

The second carriage 17 is provided with a second image mirror 17a for guiding the image light picked up by the first image mirror 16a so that the image light is guided in a predetermined direction. The second carriage 17 is also provided with a third image mirror 17b for guiding the image light, guided in the predetermined direction by the second image mirror 17a, so that the image light is guided in another predetermined direction. The second and third image mirrors 17a and 17b have reflecting surfaces which form an angle of 90°.

The image light reflected by the third mirror 17b of the second carriage 17 is converged on the CCD sensor 12 through a lens 18. The CCD sensor 12 is located at the focal position of the lens 18 that provides the image light with a reduced magnification.

A white reference plate 19 capable of reflecting white reference light is arranged in the vicinity of the document table 11. The white reference plate 19 is located near a size plate 11a. The size plate 11a determines the position where the leading end of the object O should be when this object O is set on the document table 11. In the example shown in FIG. 2, the white reference plate 19 is on the back side of the size plate 11a. When the illumination lamp 13 held on the first carriage 16 is turned on, the white reference plate 19 reflects white reference light that is used for determining a threshold level (a reference value for shading correction) of image light received by the CCD sensor 12. The light reflected by the white reference plate 19 is also used for adjusting the sensitivity of the CCD sensor 12.

A light shielding plate 16b is provided at the predetermined position on the first carriage 16. For example, the light shielding plate 16b is located at a position where it can shield the light path between the second image mirror 17a and the third image mirror 17b of the second carriage 17 when the first carriage 16 moves on the rail 15 in a direction away from the document table 11 and the distance between the first carriage 16 and the second carriage 17 is thereby shortened. When the illumination lamp 13 is turned ON, the light shielding plate 16b prevents the light directed to the CCD sensor 12 from reaching the third image mirror 17b. The length of the light shielding plate 16b, as measured in the direction in which the rail 15 extends, is determined in such a manner that the optical path between the second image mirror 17a and the third image mirror 17b is not shielded when the first carriage 16 is at the position that enables the illumination light from the illumination lamp 13 to fall on the white reference plate 19.

A switch plate 16c capable of sensing the present position of the first carriage 16 (or the second carriage 17 in rare cases) is provided at a predetermined position on the first carriage. Typically, the switch plate 16c is provided at a longitudinal end of the first image mirror 16a so that it does not interfere with the first or second carriage moving on the rail 15.

When the first carriage 16 is moved, the switch plate 16c is moved accordingly in the direction in which the rail 15 extends. As shown in FIG. 2, the switch plate 16c notifies a home position sensor HP of the passage or arrival of the first carriage 16. The home position sensor HP is located at a predetermined position on the casing (not detailed) of the scanner 102 or in the neighborhood of the rail 15. In many cases, the switch plate 16c is provided for the first carriage 16. Therefore, the home position sensor HP is arranged at the predetermined position of the scanner 102 so that the first carriage 16 can be detected when it passes through a predetermined position or comes into contact with that position. Where the switch plate 16c is provided for the second carriage, the home position sensor HP is arranged in such a manner that the home position sensor HP can detect the switch plate provided for the second carriage when the switch plate passes through the predetermined position or comes into contact with that position.

Figure 3:
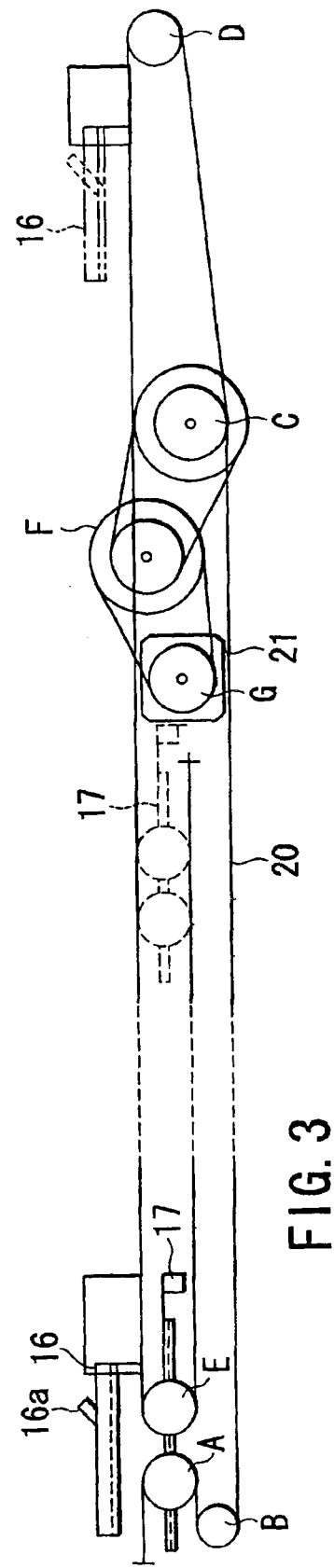
FIG. 3 is a schematic illustration showing an example of a driving mechanism which is applied to the image reading apparatus depicted in FIG. 2 and which is used for moving first and second carriages back and forth along a document table.

FIG. 3 is a schematic illustration showing an example of a driving mechanism which is applied to the image reading apparatus depicted in FIG. 2. The driving mechanism is used for moving first and second carriages back and forth along the document table.

As shown in FIG. 3, a torque of the driving motor 21 is transmitted to the first and second carriages 16 and 17 of the scanner 102 by means of a wire rope 20. The first and second carriages 16 and 17 are moved along the document table 11 at speeds that are determined by the reading magnification.

The wire rope 20 is extended, for example, as follows: It is extended from a fixed point on the frame (not shown), and is then wound around pulley A of the second carriage 17, whereby it is directed in the opposite direction. After being directed in the opposition direction again by a stationary pulley B, it is wound around a stationary pulley C (a takeup pulley) an arbitrary number of times. A torque of the driving motor 21 is transmitted to that pulley C. Then, the wire rope 20 is directed in the opposite direction again by pulley D at the opposite end, is wound around pulley E of the second carriage 17, and is then fixed. Pulley C is a decelerating pulley and is rotated at a predetermined speed in accordance with the rotation of a motor pulley G attached to the shaft of the driving motor 21. Pulley C is driven at a decelerated speed by means of a transmission element, such as a toothed belt, and an intermediate decelerating pulley F.

The first carriage 16 is fixed to the wire rope 20 between the pulley E of the second carriage 17 and the pulley D provided for the frame. When the driving motor is rotated, the first carriage 16 and the second carriage 17 are moved at a speed rate of 2:1. Naturally, the first carriage 16 moves for a distance twice as long as the distance of the second carriage 17.

The motor 21 is controlled by a controller, which will be described later with reference to FIG. 4. The motor 21 provides the wire rope 20 with an impulsion force in accordance with the reading magnification, and thus moves the first and second carriages 16 and 17.

Figure 4:
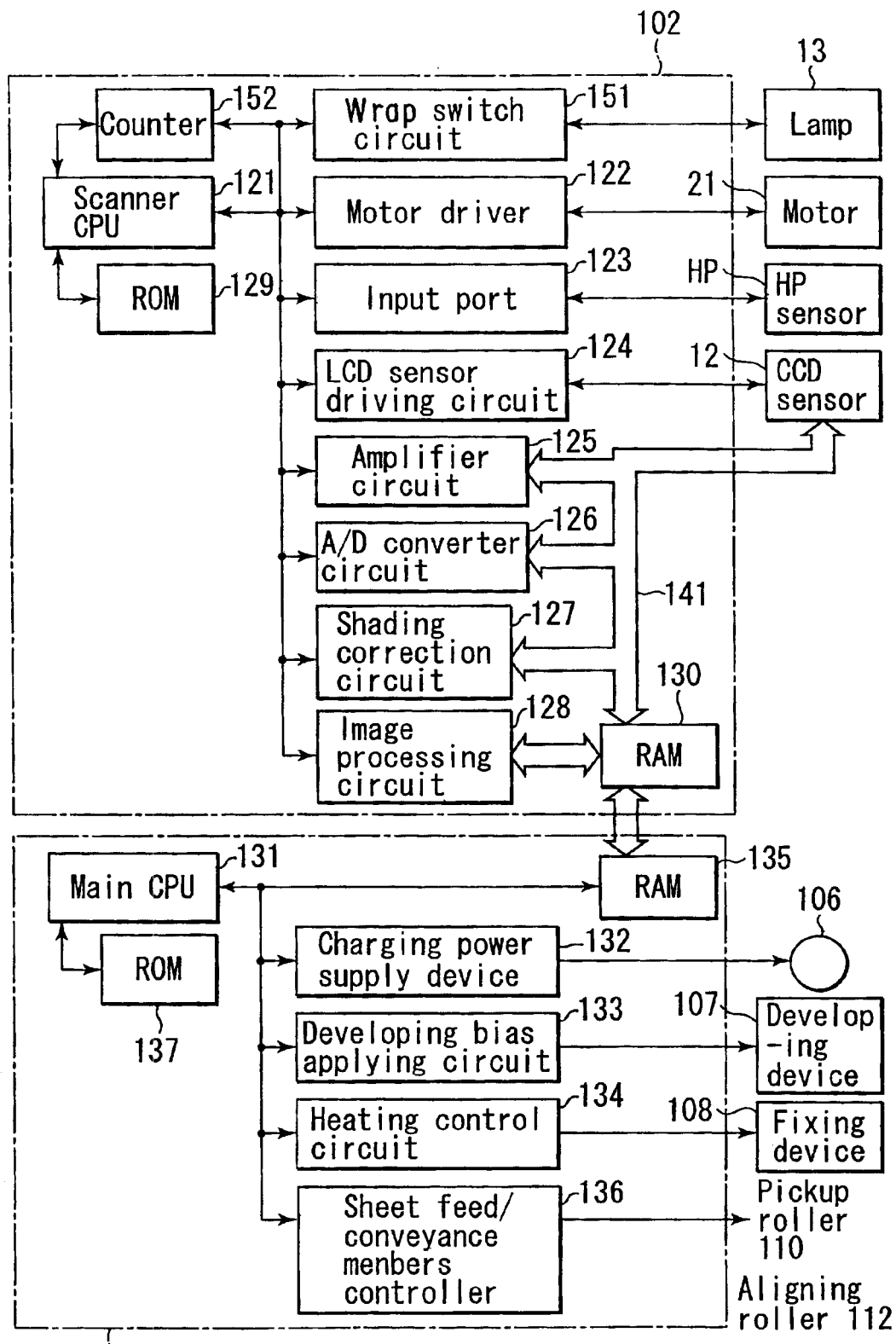
FIG. 4 is a schematic block diagram illustrating an example of a control system which is applied to the image reading apparatus shown in FIGS. 2 and 3 and the image forming apparatus shown in FIG. 1.

FIG. 4 is a schematic block diagram illustrating an example of a control system which is applied to the image reading apparatus shown in FIGS. 2 and 3 and the image forming apparatus shown in FIG. 1.

As shown in FIG. 4, the image forming apparatus 1 and the scanner 102 comprise the following: a main CPU 131 for controlling the signal exchange between the scanner 102 and the components of the digital copying machine 101; a scanner CPU 121 for controlling the components of the scanner 102; a motor driver 122 for rotating the driving motor 21 in a predetermined direction at a predetermined speed; an input port 123 for detecting an output from the home position sensor HP and for informing the scanner CPU 121 that the first carriage 17 is located at the predetermined position (or in the neighborhood thereof); a CCD sensor driving circuit 124 for driving a CCD sensor 12; an amplifier circuit 125 for amplifying an image signal from the CCD sensor 12 up to a predetermined level; an A/D converter circuit 126 for converting an image signal into a digital signal, the image signal being an analog signal output from the CCD sensor 12 and amplified by the amplifier circuit 125; a shading correction circuit 127 for executing shading correction with respect to the output signal of the CCD sensor 12 after the output signal is converted into the digital signal by the A/D converter circuit 126; an image processing circuit 128 for executing γ correction with respect to the image signal for which the shading correction has been executed, so as to attain matching between an output signal level relevance of an output image to a density value (i.e., an image output characteristic of the image forming section 103) and an output signal level of the image signal from the CCD sensor 12 relative to a density value, the image processing circuit 128 further executing image processing, such as the elimination of noise components; a ROM 129 in which an operating program of the scanner CPU 121 is stored beforehand; a RAM 130 serving as an image memory; etc. To the main CPU 131, the following structural components are connected: a charging power supply device 132 for charging the photosensitive drum 106 of the image forming section 103 to a predetermined potential; a developing bias applying circuit 133 for applying a predetermined developing bias voltage to the developing roller of the developing device 107; a heating control circuit 134 for controlling the ON/OFF operation of the heater of the fixing device 108 and controlling the temperature of a heat roller (not detailed) to be within a predetermined range; an image memory (RAM) 135 for storing image information which is to be exposed by the exposure device 105; a feed motor (not shown) for driving feed rollers 110 that are rotatable at respective positions predetermined for cassettes 109, the feed rollers 110 being provided to pick up sheets P from cassettes 109 at predetermined timings, the cassettes 109 storing sheets P of sizes that are selected in accordance with the size of an image on the object to be read and the copying magnification designated; a sheet feed/conveyance element controller 136 (not shown) for driving, at predetermined intervals, structural elements of a sheet feed mechanism (not detailed) which are arranged in the sheet feed path extending from the cassettes to the photosensitive drum 106, the structural elements including a sensor for detecting passage of a sheet P, a plurality of rollers arranged in the conveyance path 111, and an aligning roller 12; and a ROM 137 for storing an initial program or other kinds of programs required for operating the image forming apparatus 101.

An image signal output from the CCD sensor 12 is supplied to the amplifier circuit 125, by which it is amplified to a predetermined level. After being amplified by the amplifier circuit 125, the output of the CCD sensor is converted into a digital signal by the A/D converter circuit 126. The digital signal is supplied to the shading correction circuit 126.

The shading correction circuit 127 corrects the reference values of the black and white levels of an image signal output from the CCD sensor 12. The correction is based on black reference data and white reference data. The black reference data is generated without reference to the ON/OFF state of the illumination light that is emitted from the illumination lamp 13 in a step to be described later. The white reference data is determined on the basis of the reflected light from the CCD sensor 12.

An image output from the shading correction circuit 127 has its black and white levels corrected, as described above. The image processing circuit 128 executes γ correction with respect to this image output in accordance with the image output characteristics of the image forming section 103. The resultant image output, which is cleared of the noise components, is stored in the RAM 130.

In the case where a reading operation and a copying operation (image formation), which are to be executed for an object O set on the ADF 104 or document table 11, are designated as a series of operations by operating a control panel (not shown), the structural components of the image forming section 103 are warmed up under the control of the main CPU 131. At predetermined timings, image data is transferred from the image memory 130 to the RAM 135 by way of an image bus 141. Subsequently, a series of operations are executed. The operations include: the rotation of the photosensitive drum 106, the charging of the photosensitive drum 106, the formation of a latent image which the exposure device 105 executes by use of the image data stored in the RAM 135, the development of image data on the photosensitive drum 106 executed by the developing device 107, the transfer of the developed image onto a sheet P, and the fixing of the developed image onto the sheet P executed by the fixing device 108.

A description will now be given with reference to FIG. 5 as to how black reference data and white reference data are acquired for the shading correction by the scanner 102.

Figure 6:
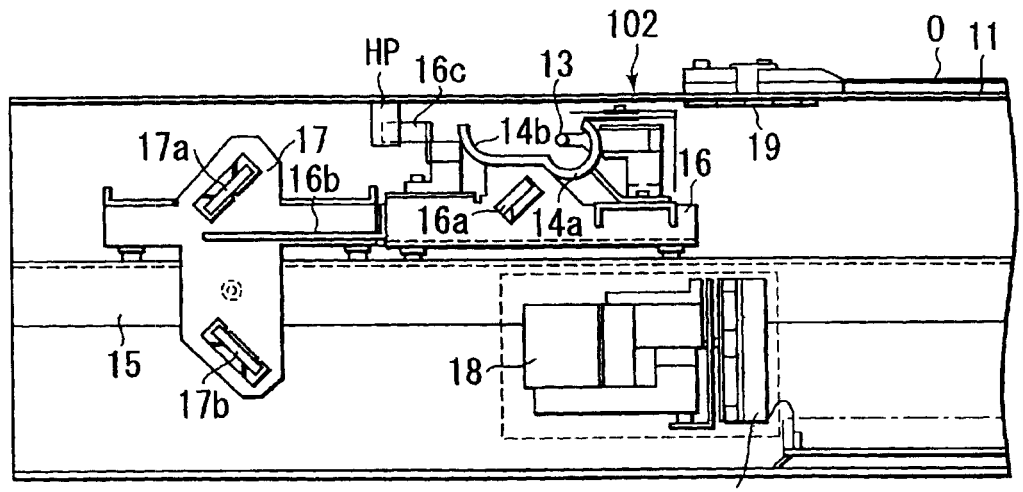
FIG. 6 is a schematic illustration showing how the first and second carriages are positioned when the black reference data is acquired for the shading correction shown in FIG. 5.

First of all, the scanner CPU 121 of the scanner 102 causes the motor driver 122 to output a voltage of predetermined magnitude and pulses of a predetermined number, and the driving motor 21 is rotated in a predetermined direction for a certain amount. As a result, the first and second carriages 16 and 17 are moved toward each home positions (not shown) in predetermined directions (S1). In an embodiment of the present invention, each of the home positions are determined in such a manner that when the carriages are at the home positions, the light shielding plate 16b of the first carriage 16 (the light shielding plate was described above with reference to FIG. 2) shields the optical path defined between the second and third image mirrors 17a and 17b of the second carriage 17, as shown in FIG. 6, later. The actual position and home position of the first carriage 16 are detected when the switch plate 16c of the first carriage 16 passes the home position sensor HP arranged at a predetermined position. Therefore, if an input to the input port 123 has switched to a high level after maintaining a low level for a certain length of time, or vice versa, this indicates that the first carriage 16 (or the second carriage 17) has reached the home position. Therefore, the arrival of the first carriage 16 is detected by monitoring a pattern representing the above or opposite state. If step S1 does not indicate that the first carriage 16 (or second carriage 17) has reached the home position (S1-NO), the routine for sensing the first carriage 16 (or second carriage 17) having reached the home position is repeated until the input pattern to the input port 123 becomes a predetermined pattern. If the predetermined pattern is not input to the input port 123 within a preset length of time, a predetermined error message is shown on a display section (not shown).

If step S1 indicates that the first carriage 16 (or second carriage 17) has reached the home position (S1-YES), a lamp lighting circuit 151 applies a predetermined voltage to the illumination lamp 13. As a result, the lamp 13 is lit (S2).

A certain length of time is required until the amount of light radiating from the illumination lamp 13 becomes saturated. In the interim, a black level for shading correction is set, using the level of the output signal of the CCD sensor 12 as standard black (S3). This setting is executed in the state the light from the lamp 13 is being shielded by the light shielding plate 16b. Although the illumination lamp 13 is lit when the black level is set, the amount of light emitted then is not saturated. In addition, the illumination lamp 13 does not face the white reference plate 19, so that the light emitted from the illumination lamp 13 hardly diffuses. Hence, the accuracy with which to obtain black standard data is enhanced.

After step S3 (in which the black level is set, with the light from the lamp 13 being shielded), a check is made to see if the amount of light radiating from the lamp 13 has saturated (S4). The check of the amount of light from the lamp 13 is easy to determine whether or not the amount of light radiating from the lamp 13 has saturated. At least one of the check is to measure the time elapsing from the designation of the illumination by the lamp lighting circuit 151 by use of a timer circuit 152 and to check if the elapsing time is longer than a preset length of time. Another one of the check is to cause the scanner CPU 121 to monitor the output of the A/D converter circuit 126 to detect if a variation which the amount of light incident on the CCD sensor 12 may undergo per unit time is smaller than a predetermined level.

If step 4 indicates that the amount of light radiating from the lamp 13 has saturated (S4-Y), the motor driver 122 receives the designation that the driving motor 21 should be rotated so as to rotate the first and second carriages 16 and 17 toward the document table 11. Accordingly, a voltage of predetermined magnitude or pulses of a predetermined number are supplied to the motor 21 (S5).

After the rotation of the driving motor 21 starts moving the first and second carriages 16 and 17 in step S5, a check is made to see whether the moving speed has attained a predetermined speed (S6). The moving speeds of the first carriage 16 and the second carriage 17 change in proportion to the amount of driving current (or the number of pulses) supplied to the driving motor 21. Therefore, the moving speed can be detected by monitoring the number of driving pulses (the amount of driving current) supplied to the driving motor 21. If the moving speed has not yet attained the predetermined speed (S6-NO), the motor driver 122 accelerates the motor 21.

If step S6 detects that the moving speeds of the first and second carriages 16 and 17 have attained their predetermined speeds (S6-YES), the motor driver 122 controls the driving motor 21 in such a manner that the rotation of this motor 21 becomes constant. Accordingly, the moving speeds of the carriages 16 and 17 are kept constant (S7).

Figure 7:
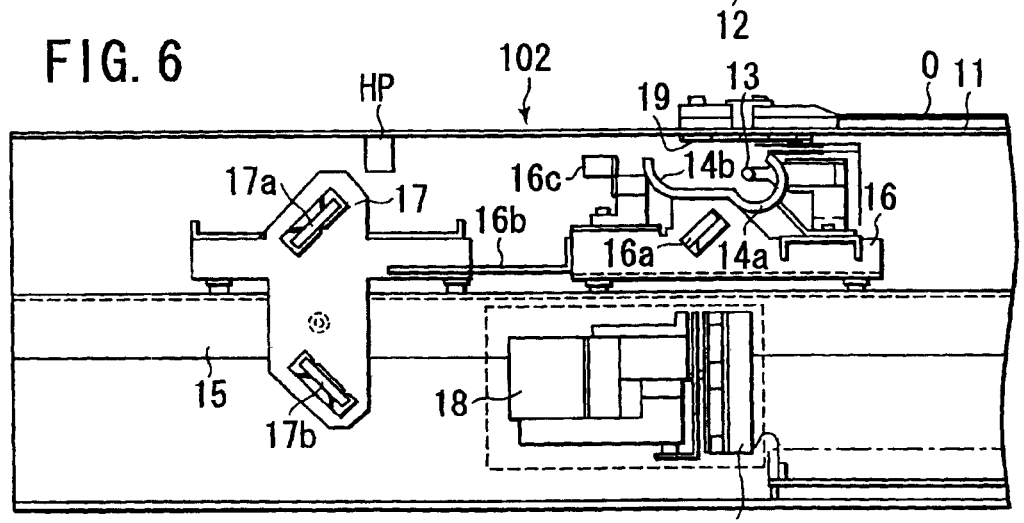
FIG. 7 is a schematic illustration showing how the first and second carriages are positioned when the white reference data is acquired for the shading correction shown in FIG. 5.

In the state shown in FIG. 7, i.e., in the state where the first carriage 16 is located in the neighborhood of the position at which the illumination lamp 13 can illuminate the white reference plate 19, and where the first carriage 16 is moving at a constant speed, the reflected light from the white reference plate 19 is reflected by the first image mirror 16a, the second image mirror 17a and the third image mirror 17b in the order mentioned. The reflected light is the illumination light which is emitted from the illumination lamp 13 and with which the white reference plate 19 is irradiated. Then, the reflected light passes through the lens 18 and is guided to the light-receiving surface (not shown) of the CCD sensor 12. A predetermined sampling time after this, white reference data is generated. A white reference data sampling position, where the white reference plate 19 and the illumination lamp 13 face each other, is defined beforehand in relation to the number of pulses the home position sensor HP supplies to the driving motor 21 (S8).

Figure 5:
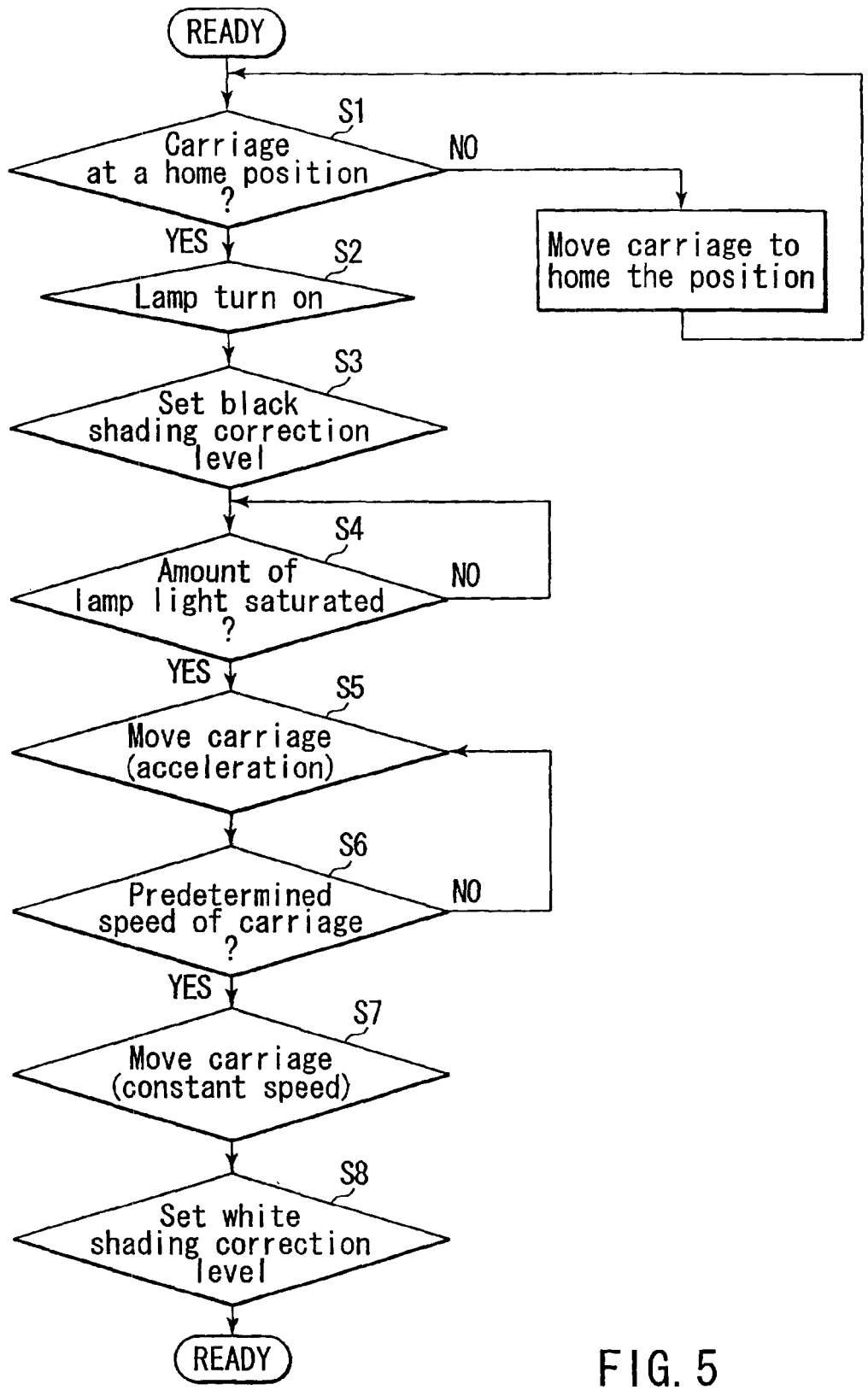
FIG. 5 is a schematic diagram illustrating an example of a step of producing or acquiring black reference data and white reference data which the image reading apparatus shown in FIGS. 2 and 3 uses for shading correction.

In the series of operations shown in FIG. 5 (i.e., the operations for obtaining black reference data and white reference data), the black reference data is usually obtained when the digital copying machine 101 has just been switched on or when it is executing a recovering operation after an internal switch is turned off due to the sheet jamming occurring in the image forming section 103. The step of obtaining white reference data is executed each time image formation is performed (each time the scanner 102 reads an image). This step is executed by performing the processing shown in FIG. 5, with step S3 omitted.

Figure 8:
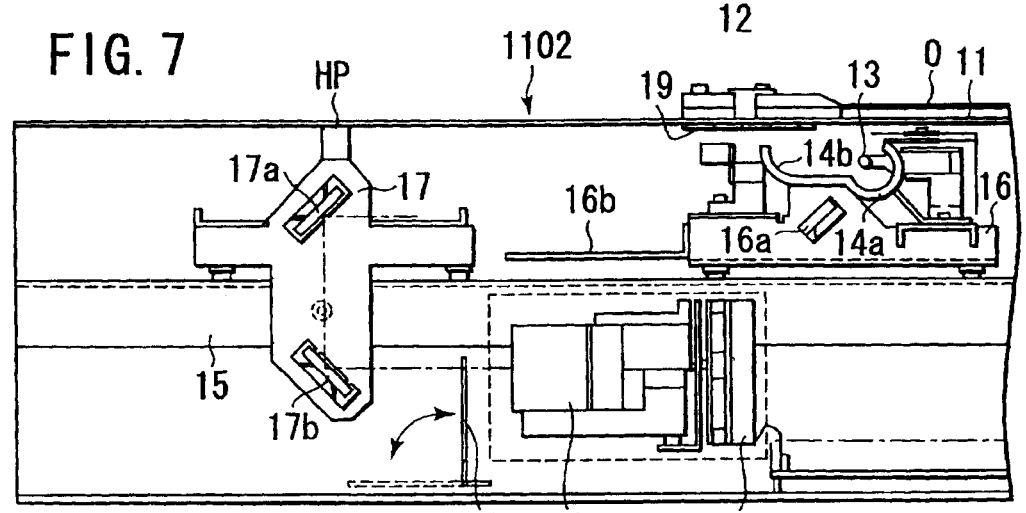
FIG. 8 is an example of a conventional scanner.

FIG. 8 shows an example of an other a light shielding member capable of to adapt for a conventional scanner 1102 wherein a light shielding plate 1112 is provided at a position immediately before a lens 18 or at a position between the lens 18 and the third image mirror 17b of a second carriage 17. Although such a light shielding plate is expected to attain a function similar to that of the light shielding plate 16b of the present invention, an increase of the manufacturing cost is inevitable.

As described above, in the image reading apparatus of the present invention, the black reference plate for shading correction is not arranged in parallel to the document table. Since there is no need to provide a space for the black reference plate, the entire apparatus can be decreased in size, accordingly.

In addition, the image reading apparatus of the present invention can sample black reference data for shading correction, independently of the operation of moving and accelerating the carriages. Thanks to this feature, the start-up time for image formation can be as short as possible. Furthermore, the black reference data can be sampled under the condition where the light emitted from illumination lamp 13 and used for obtaining white reference data hardly diffuses. Hence, the accuracy with which to perform shading correction can be enhanced.

Moreover, the accelerating distance required for accelerating a carriage holds a lamp to the read start position facing the document table can be as long as possible. Hence, image data (particularly, the image data on a leading end portion) is prevented from being degraded in quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus comprising:
   a CCD sensor which converts image information on an object to be read into an image signal;
   an illumination device which illuminates the object and generates light and shade corresponding to the image information;
   a mirror set which conveys the light and shade corresponding to the image information to the CCD sensor;
   a moving mechanism which moves the mirror set along the object at a predetermined speed;
   a driving device which provides the moving mechanism with a driving force;
   a first reference level generation mechanism which is provided at a predetermined position on the moving mechanism and allows the CCD sensor to generate a first reference level output without reference to optical intensity of illumination light emitted from the illumination device; and
   a second reference level generation mechanism which generates reflected light when illuminated by the illumination device, said second reference level generation mechanism being located at a position where the second reference level generation mechanism prevents the reflected light from being transmitted to the CCD sensor, when the first reference level generation mechanism causes the CCD sensor to produce the first reference level output, and said second reference level generation mechanism being moved away from said position by a predetermined distance, thereby enabling the reflected light to be transmitted to the CCD sensor without reference to the first reference level generation mechanism.

2. An image reading apparatus according to claim 1, wherein said second reference level generation mechanism includes a reference plate which generates a predetermined amount of reflected light when illuminated by the illumination device.

3. An image reading apparatus according to claim 1, wherein said first reference level generation mechanism includes a light shielding member which shields an optical path the mirror set defines between the illumination device and the CCD sensor, and which prevents the illumination light of the illumination device from falling on the CCD sensor.

4. An image reading apparatus according to claim 1, further comprising:
   a position notification mechanism which is provided at a predetermined position of the moving mechanism and outputs notification information regarding a position where the moving mechanism is located; and a moving mechanism position-detecting device which is located at a position related to the first and second reference level generation mechanisms, and which detects at least one of passage and arrival of the moving mechanism with reference to the position notification mechanism, wherein said first reference level generation mechanism allows the CCD sensor to generate the first reference level output when the position notification mechanism of the moving mechanism is sensed by the moving mechanism position-detecting device.

5. An image reading apparatus according to claim 4, wherein said first reference level generation circuit includes a light shielding member which shields an optical path the mirror set defines between the illumination device and the CCD sensor, and which prevents the illumination light of the illumination device from falling on the CCD sensor.

6. An image reading apparatus according to claim 1, further comprising:

a position notification mechanism which is provided at a predetermined position of the moving mechanism and outputs notification information regarding a position where the moving mechanism is located; and a moving mechanism position-detecting device which is located at a position related to the first and second reference level generation mechanisms, and which detects at least one of passage and arrival of the moving mechanism with reference to the position notification mechanism, wherein said second reference level generation mechanism provides the reflected light for the CCD sensor when the driving device has moved the moving mechanism for a distance defined by a predetermined number of pulses or a predetermined length of time after the moving mechanism position-detecting device.

7. An image reading apparatus according to claim 6, wherein said second reference level generation mechanism includes a reference plate which generates a predetermined amount of reflected light when illuminated by the illumination device.

8. An image reading apparatus comprising:

a CCD sensor which converts image information on an object to be read into an image signal;

an illumination device which illuminates the object;

a first mirror which guides image light in a predetermined direction, said image light being light-and-shade information and including image information which is generated by the object illuminated by the illumination device;

a second mirror which guides the image light transmitted from the first mirror such that the image light is guided in a predetermined direction;

a third mirror which guides the image light transmitted from the second mirror such that the image light is guided in a predetermined direction;

a lens which forms an image on the CCD sensor by converging the image light transmitted from the third mirror;

a first mirror moving mechanism which holds the first mirror and the illumination device to be movable along the image information on the object;

a second mirror moving mechanism which movably holds the second mirror and the third mirror, said second mirror moving mechanism being moved by the first mirror moving mechanism such that a moving distance of said second moving mechanism is half that of the first mirror moving mechanism;

a driving device for generating an impulsion force that allows the first and second mirror moving mechanisms to move in a predetermined direction; and a first reference level generation mechanism which is provided at a predetermined position on the first mirror moving mechanism and allows the CCD sensor to generate a first reference level output by shielding a light path between the second and third mirrors held by the second mirror moving mechanism when the first mirror moving mechanism is moved in the predetermined direction by the impulsion force provided by the driving device; and a second reference level generation mechanism which generates reflected light when illuminated by the illumination device, said second reference level generation mechanism being located at a position where the second reference level generation mechanism prevents the reflected light from being transmitted to the CCD sensor, when the first reference level generation mechanism causes the CCD sensor to produce the first reference level output, and said second reference level generation mechanism being moved away from said position by a predetermined distance, thereby enabling the reflected light to be transmitted to the CCD sensor without reference to the first reference level generation mechanism.

9. An image reading apparatus according to claim 8, further comprising:

a position notification mechanism which is provided at a predetermined position of the moving mechanism and outputs notification information regarding a position where the moving mechanism is located; and a moving mechanism position-detecting device which is located at a position related to the first and second reference level generation mechanisms, and which detects at least one of passage and arrival of the moving mechanism with reference to the position notification mechanism, wherein said first reference level generation mechanism allows the CCD sensor to generate the first reference level output when the position notification mechanism of the moving mechanism is sensed by the moving mechanism position-detecting device.

10. An image reading apparatus according to claim 9, wherein said second reference level generation mechanism includes a reference plate which generates a predetermined amount of reflected light when illuminated by the illumination device.

11. An image reading apparatus according to claim 8, further comprising:

a position notification mechanism which is provided at a predetermined position of the moving mechanism and outputs notification information regarding a position where the moving mechanism is located; and a moving mechanism position-detecting device which is located at a position related to the first and second reference level generation mechanisms, and which detects at least one of passage and arrival of the moving mechanism with reference to the position notification mechanism, wherein said second reference level generation mechanism provides the reflected light for the CCD sensor when the driving device has moved the moving mechanism for a distance defined by a predetermined number of pulses or a predetermined length of time after the moving mechanism position-detecting device.

12. An image reading apparatus according to claim 11, wherein said second reference level generation mechanism includes a reference plate which generates a predetermined amount of reflected light when illuminated by the illumination device.

13. An image reading apparatus according to claim 8, wherein said second reference level generation mechanism includes a reference plate which generates a predetermined amount of reflected light when illuminated by the illumination device.

14. An image forming apparatus comprising:

an image reading apparatus including:

a CCD sensor which converts image information on an object to be read into an image signal;

an illumination device which illuminates the object;

a first mirror which guides image light in a predetermined direction, said image light being light-and-shade information and including image information which is generated by the object illuminated by the illumination device;

a second mirror which guides the image light transmitted from the first mirror such that the image light is guided in a predetermined direction;

a third mirror which guides the image light transmitted from the second mirror such that the image light is guided in a predetermined direction;

a lens which forms an image on the CCD sensor by converging the image light transmitted from the third mirror;

a first mirror moving mechanism which holds the first mirror and the illumination device to be movable along the image information on the object;

a second mirror moving mechanism which movably holds the second mirror and the third mirror, said second mirror moving mechanism being moved by the first mirror moving mechanism such that a moving distance of said second moving mechanism is half that of the first mirror moving mechanism;

a driving device for generating an impulsion force that allows the first and second mirror moving mechanisms to move in a predetermined direction;

a first reference level generation mechanism which is provided at a predetermined position on the first mirror moving mechanism and allows the CCD sensor to generate a first reference level output by shielding a light path between the second and third mirrors held by the second mirror moving mechanism when the first mirror moving mechanism is moved in the predetermined direction by the impulsion force provided by the driving device;

a second reference level generation mechanism which generates reflected light when illuminated by the illumination device, said second reference level generation mechanism being located at a position where the second reference level generation mechanism prevents the reflected light from being transmitted to the CCD sensor, when the first reference level generation mechanism causes the CCD sensor to produce the first reference level output, said second reference level generation mechanism being moved away from said position by a predetermined distance, thereby enabling the reflected light to be transmitted to the CCD sensor without reference to the first reference level generation mechanism;

a position notification mechanism provided at a predetermined position of the first mirror moving mechanism and outputting notification information regarding a position where the first mirror moving mechanism is located; and a moving mechanism position-detecting device which is located at a position related to the first and second reference level generation mechanisms, and which detects at least one of passage and arrival of the first mirror moving mechanism with reference to the position notification mechanism;

a photosensitive member on which an image corresponding to the image data read by the image reading is formed; and a developing device for supplying a developing agent to the image formed on the photosensitive member, wherein said first reference level generation mechanism enables the CCD sensor to generate a first reference level when the moving mechanism position-detecting device detects the position notification mechanism provided on the first mirror moving mechanism, and said second reference level generation mechanism provides reflected light toward the CCD sensor in a preset period of time, said preset period of time starting at a time when the moving mechanism position-detecting device has detected the position notification mechanism provided on the first mirror moving mechanism and ending at a time when the driving device has moved the first mirror moving mechanism by a distance corresponding to a predetermined number of pulses or a predetermined length of time.

15. An image forming apparatus according to claim 14, wherein said second reference level generation mechanism includes a reference plate which generates a predetermined amount of reflected light when illuminated by the illumination device.

* * * * *